(12) United States Patent
Beyfuss et al.

(10) Patent No.: US 12,467,502 B2
(45) Date of Patent: *Nov. 11, 2025

(54) BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Jonas Schierling, Hassfurt (DE); Martin Kemmer, Werneck (DE)

(73) Assignee: AKTIEBOLAGET SKF, Gothenburg (SE)

( * ) Notice: Subject to any disclaimer, the term of this patent is extended or adjusted under 35 U.S.C. 154(b) by 105 days.

This patent is subject to a terminal disclaimer.

(21) Appl. No.: 18/091,491

(22) Filed: Dec. 30, 2022

(65) Prior Publication Data

US 2023/0220877 A1    Jul. 13, 2023

(30) Foreign Application Priority Data

Jan. 13, 2022    (DE) .......................... 102022200327.6

(51) Int. Cl.
*F16C 33/46*    (2006.01)
*F16C 33/66*    (2006.01)

(52) U.S. Cl.
CPC ...... *F16C 33/4611* (2013.01); *F16C 33/4676* (2013.01); *F16C 33/4682* (2013.01); *F16C 33/6611* (2013.01)

(58) Field of Classification Search
CPC .............. F16C 33/3831; F16C 33/4611; F16C 33/4676; F16C 33/4682; F16C 33/6611; F16C 33/6614
See application file for complete search history.

(56) References Cited

U.S. PATENT DOCUMENTS

| | | |
|---|---|---|
| 2,269,224 A | 1/1942 | Reilly |
| 2,417,559 A | 3/1947 | Larson |
| 2,591,160 A | 4/1952 | Kilian |

(Continued)

FOREIGN PATENT DOCUMENTS

| | | |
|---|---|---|
| CN | 103415717 A | 11/2013 |
| CN | 104475350 A | 4/2015 |

(Continued)

OTHER PUBLICATIONS

Translatoin of DE102015204067 obtained Sep. 10, 2024.*

(Continued)

*Primary Examiner* — James Pilkington
(74) *Attorney, Agent, or Firm* — J-TEK LAW PLLC; Scott T. Wakeman; Mark A. Ussai

(57) ABSTRACT

A bearing cage for large rolling-element bearings includes a first side part and a second side part and a plurality of bridge elements connecting the first and second side parts to form a plurality of cage pockets each configured to receive a rolling element. The at least one bridge element and/or the first side part and/or the second side part includes at least one opening, and an insert element is mounted in each of the at least one opening and configured to contact the rolling element.

14 Claims, 1 Drawing Sheet

(56) References Cited

U.S. PATENT DOCUMENTS

| | | |
|---|---|---|
| 2,721,776 A | 10/1955 | Ture |
| 2,946,633 A | 7/1960 | Andreas |
| 3,202,467 A | 8/1965 | Karl-Albert |
| 3,313,582 A | 4/1967 | Henry |
| 3,353,246 A | 11/1967 | Farmer |
| 3,356,428 A | 12/1967 | Ralph |
| 3,473,857 A | 10/1969 | Pitner |
| 3,605,247 A | 9/1971 | Bingle et al. |
| 3,820,867 A | 6/1974 | Dickinson et al. |
| 3,902,772 A | 9/1975 | Spate |
| 4,397,507 A | 8/1983 | Kraus et al. |
| 4,577,088 A | 3/1986 | Sharp |
| 4,821,386 A | 4/1989 | Simon et al. |
| 5,187,345 A | 2/1993 | Alling et al. |
| 5,255,985 A | 10/1993 | Alling |
| 5,528,706 A | 6/1996 | Harimoto et al. |
| 6,330,748 B1 | 12/2001 | Müntnich et al. |
| 6,752,535 B2 | 6/2004 | Krochak |
| 6,883,968 B2 | 4/2005 | Fugel et al. |
| 7,571,706 B2 | 8/2009 | Ichikawa et al. |
| 8,696,210 B2 | 4/2014 | Kawai et al. |
| 8,770,854 B2 | 7/2014 | Friedrich et al. |
| 9,239,077 B2 | 1/2016 | Doki-Thonon et al. |
| 9,382,947 B2 | 7/2016 | Ishibashi |
| 9,429,194 B2 | 8/2016 | Reimchen |
| 9,512,881 B2 | 12/2016 | Katayama et al. |
| 9,551,377 B2 | 1/2017 | Haas et al. |
| 11,149,793 B2 | 10/2021 | Friedrich et al. |
| 2007/0248298 A1 | 10/2007 | Chihara |
| 2008/0245631 A1 | 10/2008 | Bochen et al. |
| 2012/0063713 A1 | 3/2012 | Beuerlein |
| 2012/0170883 A1 | 7/2012 | Evans et al. |
| 2013/0034321 A1 | 2/2013 | Beck et al. |
| 2013/0308890 A1 | 11/2013 | Steblau |
| 2015/0159696 A1 | 6/2015 | Manne et al. |
| 2016/0003298 A1 | 1/2016 | Masuch et al. |
| 2016/0017919 A1 | 1/2016 | Haas et al. |
| 2019/0226528 A1 | 7/2019 | Hainz et al. |
| 2021/0372475 A1 | 12/2021 | Friedrich et al. |
| 2022/0403883 A1 | 12/2022 | Beyfuss et al. |
| 2022/0403885 A1 | 12/2022 | Beyfuss et al. |
| 2022/0403886 A1 | 12/2022 | Beyfuss et al. |
| 2023/0220879 A1* | 7/2023 | Beyfuss ............ F16C 33/6696 384/577 |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 2111081 A1 | 9/1972 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102008034922 A1 | 2/2010 |
| DE | 102009017751 A1 | 10/2010 |
| DE | 102009034018 A1 | 12/2010 |
| DE | 102009004657 B4 | 2/2011 |
| DE | 102012221097 A1 | 5/2014 |
| DE | 102013218286 A1 | 3/2015 |
| DE | 102013220833 A1 | 4/2015 |
| DE | 102015210924 A1 | 7/2016 |
| DE | 102015204067 A1 * | 9/2016 |
| DE | 102015206533 A1 | 10/2016 |
| DE | 102016201052 A1 | 7/2017 |
| DE | 102016216286 A1 | 3/2018 |
| DE | 102016222336 A1 | 5/2018 |
| DE | 102017117010 A1 | 7/2018 |
| DE | 102017103761 A1 | 8/2018 |
| DE | 102017127529 A1 | 5/2019 |
| DE | 102019115335 A1 | 12/2020 |
| EP | 0074803 A1 | 3/1983 |
| EP | 0750125 A1 | 12/1996 |
| EP | 2213894 A1 | 8/2010 |
| EP | 2677184 A1 | 12/2013 |
| EP | 2839175 B1 | 5/2016 |
| EP | 4105506 A1 | 12/2022 |
| FR | 2234483 A1 | 1/1975 |
| FR | 2514440 A1 | 4/1983 |
| FR | 2612102 A1 | 9/1988 |
| FR | 3013087 A1 | 5/2015 |
| GB | 1431612 A | 4/1976 |
| GB | 2103307 A | 2/1983 |
| JP | H0742744 A | 2/1995 |
| JP | 07317773 A | 12/1995 |
| JP | H07317773 A | 12/1995 |
| JP | H08270658 A | 10/1996 |
| JP | 2005076697 A | 3/2005 |
| JP | 2006064044 A | 3/2006 |
| JP | 2007247856 A | 9/2007 |
| JP | 2008144879 A | 6/2008 |
| JP | 2008215390 A | 9/2008 |
| JP | 2008215615 A | 9/2008 |
| JP | 2009243556 A | 10/2009 |
| JP | 2011033063 A | 2/2011 |
| JP | 4786124 B2 | 10/2011 |
| JP | 2013007435 A | 1/2013 |
| JP | 2013061076 A | 4/2013 |
| JP | 2013108587 A | 6/2013 |
| JP | 2015102131 A | 6/2015 |
| JP | 2017026083 A | 2/2017 |
| JP | 6197844 B2 | 9/2017 |
| NL | 6910823 A | 3/1970 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

OTHER PUBLICATIONS

Extended European Search Report from the European Patent Office dispatched May 12, 2023, in related application No. EP 23150846.6, including European Search Opinion, and machine translation thereof.
Extended European Search Report from the European Patent Office dispatched May 12, 2023, in related application No. EP 23150847.4, including European Search Opinion, and machine translation thereof.
LaserJob, Inc., Laser Material Processing, Oct. 2012, p. 2 (Year: 2012).
Office Action from the United States Patent Office mailed Apr. 29, 2024 in related U.S. Appl. No. 17/835,124.
European Search Report from the European Patent Office dispatched Feb. 11, 2022, in related application No. EP 22178213.9, including European Search Opinion.
Office Action from the United States Patent Office mailed Jun. 1, 2023 in related U.S. Appl. No. 17/835,086.
Office Action from the United States Patent Office mailed Jun. 1, 2023 in related U.S. Appl. No. 17/835,089.
Office Action from the United States Patent Office mailed Mar. 2, 2023 in related U.S. Appl. No. 17/400,177.
Office Action from the United States Patent Office mailed Mar. 30, 2023 in related U.S. Appl. No. 17/350,081.
Office Action from the United States Patent Office mailed Aug. 14, 2024 in related U.S. Appl. No. 18/091,485.

* cited by examiner

BEARING CAGE

CROSS-REFERENCE

This application claims priority to German patent application no. 10 2022 200 327.6 filed on Jan. 13, 2022, the contents of which are fully incorporated herein by reference.

TECHNOLOGICAL FIELD

The present disclosure is directed to a bearing cage having an opening in a bridge or an opening in a side part and an insert element mounted in the opening.

BACKGROUND

Rolling-element bearing cages are often used in rolling-element bearings in order to simultaneously guide and space the rolling elements. For this purpose a part of the rolling-element bearing cage can also serve as a spacer between the rolling elements. Depending on the size of the rolling elements, for this purpose a certain material strength in the rolling-element bearing cage can be necessary especially in zones in which the rolling elements have contact with the rolling-element bearing cage, in order to both compensate for the spacing between the rolling elements and also, in particular with large rolling elements, to be able to withstand the weight of a rolling element. However, this necessary material thickness can only be reshaped with difficulty during the manufacturing of rolling-element contact zones due to the high forces necessary for this purpose.

A rolling-element bearing cage is usually configured for a specific rolling-element bearing so that even with a small change of the rolling-element geometry, such as, for example, a changed rolling-element length, it can be necessary to redesign and/or exchange the entire rolling-element cage. Different rolling-element geometries may change lubrication requirements, and, under certain circumstances, this may require changes to the rolling-element bearing cage.

SUMMARY

It is therefore an aspect of the present disclosure to provide a bearing cage that is easily and flexibly adaptable to various rolling-element geometries and/or requirements for the rolling-element bearing cage.

In the following a bearing cage is described, in particular for large rolling-element bearings, with first and second side parts and a plurality of bridge elements connecting the side parts, wherein the side parts and the bridge elements form cage pockets that are configured to receive at least one rolling element. The rolling-element bearing can in particular be a roller bearing, i.e., a rolling-element bearing with roller-shaped rolling elements, such as, for example, tapered rollers, cylindrical rollers, barrels, needles, and the like. The bearing cage is preferably formed from metal, in particular sheet metal, and/or from plastic. Furthermore, the bearing cage can be formed from a solid material. Alternatively or additionally, the bearing cage can be configured one-part or multi-part.

In order to be able to easily and flexibly adapt to various rolling-element geometries and/or requirements, at least one bridge element and/or side element includes at least one opening in which an insert element is received that is configured to contact at least the received rolling element. In other words, the first and second side part or side element and the at least one bridge element form a cage basic structure that with the aid of the at least one insert element can be adapted to different designs for a bearing cage. For example, the same cage basic structure can thereby be used for different rolling elements in which only the insert element is exchanged. Furthermore, the insert element also has the advantage that the first and/or second side part and/or the at least one bridge element can be made thinner, since any spacing differences between the rolling elements can be compensated for by the insert element. In addition to a weight and material savings, this has the further advantage that due to the thinner first and/or second side part and/or bridge element, especially in large rolling-element bearings, more rolling elements can be accommodated in the rolling-element bearing, whereby an efficiency and/or a service life of the rolling-element bearing can be increased.

The at least one opening can extend, for example, through the entire wall thickness of the side part and/or bridge element. Alternatively the opening can also extend only partially through the wall thickness of the side part and/or bridge element, and, for example, be configured as a type of blind hole. Furthermore, the bearing cage can be guided on the rolling elements, or alternatively the bearing cage can guide the rolling elements. Furthermore, an insert element can be received in more than one opening, for example, in two openings.

The insert element can preferably have a shape that is suitable for guiding the rolling element and/or of the bearing cage. For example, the insert element can be configured to come into contact with a rolling element. Furthermore, in the region of the rolling-element abutment surface, the insert element can be provided, on a side that is facing the rolling element, with a shape and/or with a structure based on the rolling element receivable in the pocket—a shape that is convex or substantially conforms to the conical or cylindrical side of the roller for example. Furthermore, the insert element can also be configured to provide a raceway guide for the bearing cage. The combination of bearing cage and insert element allows the different requirements that are placed on a bearing cage can be divided over two components. Here in particular the bearing cage can serve as a frame and basic structure that is relatively simply and economical to manufacture, while the insert element can be configured to adapt the bearing cage for use with different rolling-element geometries.

According to a further embodiment, the insert element is configured to adapt a dimensioning of the cage pocket to the received rolling element. A thickness of the insert element is preferably different from a thickness of the first side part and/or of the second side part and/or a bridge element. For example, when the insert element is disposed on one of the side parts of the bearing cage, a length of the rolling element can be compensated for, and when the insert element is disposed on a bridge element, a diameter of the rolling element can be compensated for. For example, a standardized cage basic structure can thereby be used for different-size rolling elements so that it is not necessary to provide a corresponding cage basic structure for each rolling-element size. Instead, the difference in the geometry between the rolling element and the formed pocket can be compensated for by the insert element. In particular, a prototype can thereby also be manufactured in a rapid and simple manner.

Alternatively or additionally to guiding the bearing cage and/or the rolling element, the insert element can be configured as a lubricant reservoir in which preferably the surface of the insert element is provided with a structure and/or in which, preferably, the insert element is manufactured from a solid lubricant material. For example, the insert element can be manufactured from a sponge-type material, a porous material, and/or a sintered material that can furthermore be configured to store a lubricant, for example, in its pores. Furthermore, the insert element can include at least one first zone and one second zone, in which the zones differ in at least one functional property. For example, one zone can be configured to store lubricant and a further zone can be configured as a damping element. In particular, the first and the second zones can be manufactured from different materials.

According to a further preferred embodiment, the insert element is configured as a damping element, the insert element preferably being manufactured from an elastic material and/or a material having an elasticity greater than that of the material from which the basic cage structure is formed. For example, the insert element can be made of a hard, abrasion-resistant foam. This makes it possible to reduce impacts and/or blows on the rolling elements, since no steel-steel contact takes place. In this way it can advantageously be prevented, in particular with large and/or heavy rolling elements, that adjacent rolling elements and/or the bearing cage are damaged, since material chipping can be reduced.

The insert element is preferably releasably or captively attached in the at least one opening. For example, conventional joining methods can be used in order to securely attach the insert element in the at least one opening. For example, the at least one insert element can be attached in the at least one opening in an interference-fit, friction-fit, and/or material-bonded manner. For example, the insert element can be attached by clipping, gluing, overmolding, injection molding, and/or welding.

Furthermore, the insert element can be manufactured from a metal, preferably from brass and/or steel, and/or from a plastic, in particular an abrasion-resistant plastic. This advantageously makes it possible to provide an insert element with a high strength. Alternatively or additionally, the insert element can also be manufactured from a different material, such as, for example, wood, felt, ceramic, etc. The at least one insert element can preferably be cut, in particular laser-cut, punched, and/or nibbled, whereby in turn only low tool costs arise. Alternatively or additionally, the insert element can be provided with pores, for example, be manufactured from a cast or sintered workpiece so that due to its pores it can store lubricant and can thus be configured as a lubricant reservoir.

The at least one opening is preferably configured as a recess or a notch. A recess is in particular an opening that extends through the entire wall thickness of the side part and/or bridge element, wherein the material of the side part and/or bridge element forms a closed frame about the recess. In contrast thereto, with a notch the material does not form a closed frame, but rather is open at least on one side, so that with a notch the insert element can also be inserted into the opening by pushing it into the opening.

According to a further aspect, an insert element is disclosed for a bearing cage described above.

According to a still further aspect, a rolling-element bearing, in particular a large rolling-element bearing, includes at least one inner ring and at least one outer ring, wherein rolling elements are disposed between the inner ring and the outer ring, and the rolling elements are held by an above-described bearing cage.

According to another embodiment, a bearing cage for rolling-element bearings includes a first side part, a second side part and a plurality of bridge elements connecting the first and second side parts to form a plurality of cage pockets each configured to receive a rolling element. The plurality of bridge elements includes a first bridge element and a second bridge element, and the plurality of cage pockets includes a first cage pocket and a second cage pocket. The first cage pocket is separated from the second cage pocket by the first bridge element. Each of the plurality of bridge elements includes an opening, and the opening of the first bridge element may be referred to as a first opening and the opening of the second bridge element may be referred to as a second opening. A first insert element is mounted in the first opening and a second insert element is mounted in the second opening, and the first and second insert elements are configured to contact the rolling element. The first insert element extends through the first bridge element such that a first portion of the first insert element is located on a first side of the first bridge element inside the first cage pocket and a second portion of the first insert element is located on a second side of the first bridge element inside the second cage pocket. The first portion of the first insert element has a first concave surface configured to interact with a conical or cylindrical wall of the rolling element in the first cage pocket, and the second portion of the first insert element has a second concave surface configured to interact with a conical or cylindrical wall of the rolling element in the second cage pocket.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
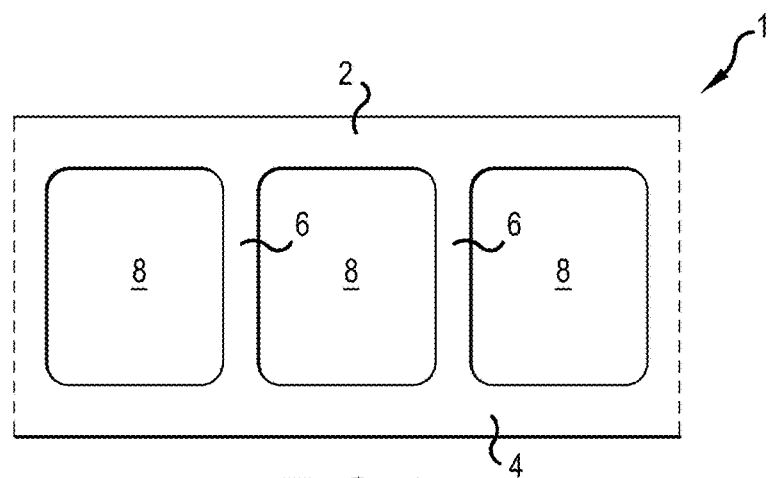
FIG. 1 is a schematic view of a part of a bearing cage according to a first embodiment of the present disclosure.
Figure 2:
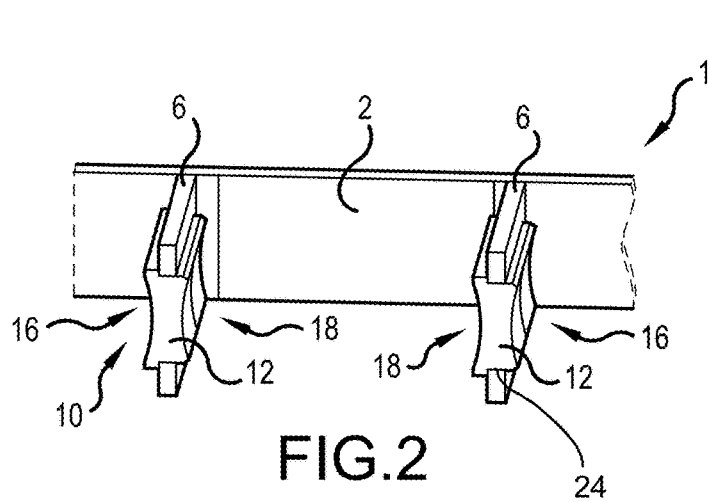
FIG. 2 is a schematic sectional view through the bearing cage of FIG. 1.
Figure 3:
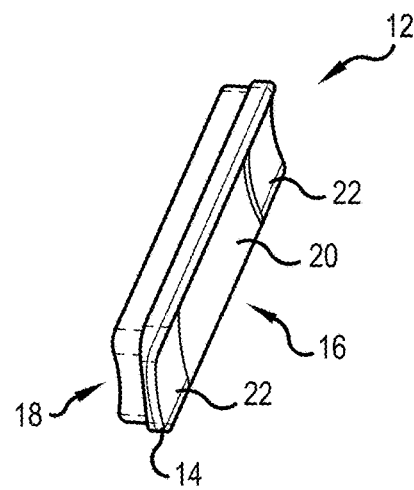
FIG. 3 is a perspective view of the insert element of FIG. 2.

FIGS. 1 to 3 show an embodiment of a bearing cage 1 that is particularly suitable for large rolling-element bearings. The bearing cage 1 has a cage basic structure with a first side part 2, a second side part 4, and a plurality of bridge elements 6 that connect the side parts 2, 4. Here the side parts and the bridge elements form cage pockets 8 that are configured to receive at least one rolling element (not depicted). The bearing cage 1 can be used, for example, in a roller bearing, i.e., in a rolling-element bearing with roller-shaped rolling elements, such as, for example, tapered rollers, cylindrical rollers, barrels, needles, and the like. The bearing cage is preferably formed from metal, in particular sheet metal, and/or from plastic. Furthermore, the bearing cage can be formed from a solid material.

Figure 4:
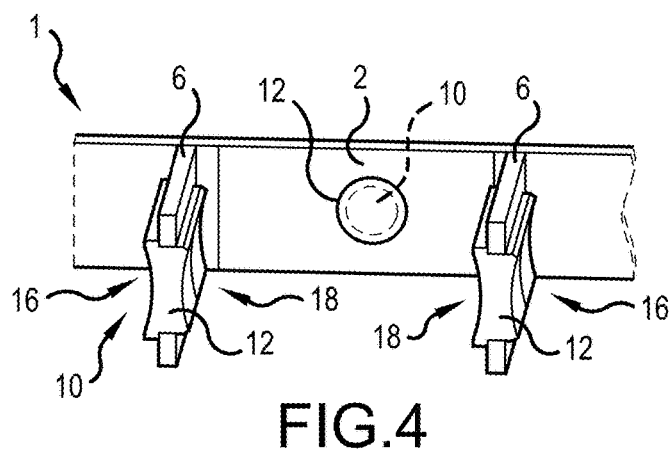
FIG. 4 is a schematic sectional view through the bearing cage of FIG. 1 showing an insert element in one of the side parts of the bearing cage.
Figure 5:
FIG. 5 is a side elevational view of the side-part insert element of FIG. 4

In order to be able to more flexibly adapt the cage basic structure of the bearing cage 1 to the stipulated requirements, the bridge elements 6 include an opening 10 (FIG. 2), in which an insert element 12 (FIG. 2) is received that is configured to contact at least the received rolling element. The insert element 12 meets the bridge element 6 at a joint 24. Additionally or alternatively, the first and/or second side part 2, 4 can also be provided with an opening 10 and an insert element 12. An insert element 12 in an opening 10 in one of the side parts 2 is illustrated in FIG. 4, and the insert element 12 from the opening 10 in the side part 2 is illustrated by itself in FIG. 5.

In the exemplary embodiment shown, the opening 10 is formed as a recess into which the insert element 12 can be inserted. Alternatively the opening can also be configured as a notch into which the insert element 12 can be slid. In the opening 10, the insert element 12 can be attached with a conventional joining method, for example, in an interference-fit, friction-fit, and/or material-bonded manner. The insert element 12 can also be releasably or captively attached in the opening 10. For example, the insert element can be attached by clipping, adhesion, and/or welding. In the embodiment shown the opening 10 extends through the entire wall thickness of the bridge element 6. Alternatively the opening 10 can also extend only partially through the wall thickness of the bridge element 6, and can be configured, for example, as a type of blind hole.

As can be seen in FIG. 2, the insert element 12, which is depicted more precisely in FIG. 3, is inserted into the opening. For this purpose the insert element 12 includes an encircling projection 14 with which the insert element 12 abuts against the bridge element 6 and is thereby held in the opening 10. Of course, designs other than an encircling projection 14 can also be used in order to hold the insert element 12 in the opening 10. For example, instead of an encircling projection 14, a plurality of separate projections can also be provided. If the opening 10 is configured as a notch, a groove can also be provided, either in the insert element or the opening, into which groove a corresponding projection can be slid.

In order to adapt the cage basic structure of the bearing cage 1 to other requirements, such as, for example, new rolling elements, the insert element 12 is configured to come into contact with the rolling element, and, for example, to hold the rolling element in the pocket 8 at a desired position, or to prevent that the bearing cage 1 from migrating radially outward in use. For this purpose the surfaces 16, 18 of the insert element 12, which in use are facing the rolling element, are provided with a curvature in the region of the rolling-element abutment surface. In this case a change of the bearing cage guiding, for example, from a raceway guiding to a rolling-element guiding, can be effected by a change of the insert element 12.

Additionally or alternatively, these surfaces can also be provided with a structure in order, for example, to improve a supply of lubricant to the rolling element. The thickness of the insert element 12 differs from the thickness of the bridge element 6 and/or the side parts 2, 4, so that a spacing between the rolling element and the bearing cage 1 can advantageously be compensated for. That is, the insert elements are configured to reduce a circumferential and/or axial dimension of the pockets.

The insert element 12 is preferably manufactured from an abrasion-resistant material, such as, for example, from a metal, preferably from brass and/or steel, and/or from a plastic. Alternatively or additionally, the insert element 12 can have pores. For example, the insert element 12 can be manufactured from a cast or sintered workpiece so that due to the pores it can store lubricant and thus serve as a lubricant reservoir. In this case the insert element 12 serves as a wear part that can be exchanged when the lubricant stored in the insert element 12 is consumed. Furthermore, the insert element 12 can also be formed from a solid-lubricant material.

Depending on the material of the insert element 12, the insert element 12 can also have damping properties and can be configured as a damping element that reduces impacts and/or blows on the rolling element. For this purpose the insert element 12 can be manufactured from a hard, abrasion-resistant foam. The insert element 12 can preferably be cut, in particular laser-cut, punched, and/or nibbled, whereby in turn only low tool costs arise.

As can furthermore be seen in FIG. 3, in the exemplary embodiment depicted, the insert element 12 has a first zone 20 and two second zones 22. The two zones 20, 22 differ from each other in particular in a material property. For example, the first zone 20 is configured to store lubricant, and the second zones 22 are configured as damping elements.

In summary, a bearing cage 1 is disclosed that includes an opening 10 into which a separate insert element 12 is inserted. This makes it possible to provide a cage basic structure that is formed from the side parts 2, 4 and the at least one bridge element 6 and that can be adapted to the individual requirements of the bearing cage 1 by the at least one insert element 12.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing cage
2 Side part

4 Side part
6 Bridge element
8 Pocket
10 Opening
12 Insert element
14 Projection
16, 18 Surface
20, 22 Zone
24 Joint

What is claimed is:

1. A bearing cage for rolling-element bearings comprising:
   a first side part;
   a second side part; and
   a plurality of bridge elements connecting the first and second side parts to form a plurality of cage pockets each configured to receive a rolling element,
   wherein the plurality of bridge elements includes a first bridge element and a second bridge element and the plurality of cage pockets includes a first cage pocket and a second cage pocket, the first cage pocket being separated from the second cage pocket by the first bridge element,
   wherein each of the plurality of bridge elements includes an opening, the opening of the first bridge element being a first opening and the opening of the second bridge element being a second opening,
   wherein a first insert element is mounted in the first opening and a second insert element is mounted in the second opening, the first and second insert elements being configured to contact the rolling element,
   wherein the first insert element extends through the first bridge element such that a first portion of the first insert element is located on a first side of the first bridge element inside the first cage pocket and a second portion of the first insert element is located on a second side of the first bridge element inside the second cage pocket,
   wherein the first portion of the first insert element has a first concave surface configured to interact with a conical or cylindrical wall of the rolling element in the first cage pocket, and
   wherein the second portion of the first insert element has a second concave surface configured to interact with a conical or cylindrical wall of the rolling element in the second cage pocket.

2. The bearing cage according to claim 1,
   wherein the first insert element is configured as a lubricant reservoir.

3. The bearing cage according to claim 1,
   wherein a surface of the first insert element is provided with pores for retaining lubricant, and/or the first insert element is manufactured from a solid-lubricant material.

4. The bearing cage according to claim 1,
   wherein the first insert element is manufactured from a material having an elasticity greater than an elasticity of a material of the plurality of bridge elements.

5. The bearing cage according to claim 1,
   wherein the first insert element is releasably or captively attached in the first opening.

6. The bearing cage according to claim 1, wherein the first insert element is manufactured from brass or steel or plastic.

7. The bearing cage according to claim 1,
   wherein the bearing cage is formed from sheet metal and/or from plastic.

8. The bearing cage according to claim 1, wherein the first side part, the second side part and the plurality of bridge elements are configured as a one-part structure or as a multi-part structure.

9. The bearing cage according to claim 1,
   wherein the first insert element contacts the first opening at a joint.

10. The bearing cage according to claim 1,
    wherein the first insert element includes a third portion between the first portion and the second portion, and
    wherein the first insert element is retained in the first opening by a friction fit between an interior edge of the first opening and the third portion of the first insert element or by a material bond between the interior edge of the first opening and the third portion of the first insert element.

11. The bearing cage according to claim 10,
    wherein a radial width of the first concave surface is less than a radial width of the second concave surface.

12. The bearing cage according to claim 1,
    wherein a radial width of the first concave surface is less than a radial width of the second concave surface.

13. A bearing cage for rolling-element bearings comprising:
    a first side part;
    a second side part; and
    a plurality of bridge elements connecting the first and second side parts to form a plurality of cage pockets each configured to receive a rolling element,
    wherein the plurality of bridge elements and/or the first side part and/or the second side part includes at least one opening,
    wherein an insert element is mounted in each of the at least one openings and configured to contact the rolling element, and
    wherein the insert element includes a first zone having a first functional property and a second zone having a second functional property different than the first functional property.

14. A bearing cage for rolling-element bearings comprising:
    a first side part;
    a second side part; and
    a plurality of bridge elements connecting the first and second side parts to form a plurality of cage pockets each configured to receive a rolling element,
    wherein the plurality of bridge elements and/or the first side part and/or the second side part includes at least one opening,
    wherein an insert element is mounted in each of the at least one openings and configured to contact the rolling element,
    wherein the insert element extends into the pocket and is configured to guide the rolling element in the pocket,
    wherein the insert element includes pores for retaining lubricant and/or the insert element is manufactured from a solid-lubricant material,
    wherein the insert element is manufactured from a material having an elasticity greater than an elasticity of a material of the plurality of bridge elements,
    wherein the insert element is releasably or captively attached in the at least one opening, and
    wherein the bearing cage is formed from sheet metal and/or from plastic.

* * * * *